United States Patent
Liu et al.

(10) Patent No.: US 12,180,125 B2
(45) Date of Patent: Dec. 31, 2024

(54) METHOD FOR PREPARING WEATHERED COAL-DERIVED HUMIC ACID/UREA-FORMALDEHYDE SLOW-RELEASE FERTILIZER GRANULES BY REACTIVE EXTRUSION PROCESS WITH DEPOLYMERIZATION-ACTIVATION-POLYCONDENSATION TRINITY AND FERTILIZATION METHOD

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Yingfang Tong, Taiyuan (CN); Peng Gao, Taiyuan (CN); Guizhe Zhao, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 18/431,971

(22) Filed: Feb. 3, 2024

(65) Prior Publication Data

US 2024/0174578 A1 May 30, 2024

Related U.S. Application Data

(63) Continuation of application No. PCT/CN2023/118428, filed on Sep. 13, 2023.

(30) Foreign Application Priority Data

Aug. 22, 2023 (CN) .......................... 202311054388.9

(51) Int. Cl.
C05C 9/02 (2006.01)
C05F 11/02 (2006.01)
(Continued)

(52) U.S. Cl.
CPC ................ *C05C 9/02* (2013.01); *C05F 11/02* (2013.01); *C05G 3/40* (2020.02); *C05G 5/12* (2020.02)

(58) Field of Classification Search
None
See application file for complete search history.

(56) References Cited

U.S. PATENT DOCUMENTS

11,390,570 B1 * 7/2022 Merritt ..................... C05D 1/02
2017/0183272 A1   6/2017 Sanders
(Continued)

FOREIGN PATENT DOCUMENTS

CN    106083447 A  * 11/2016  ............... C05G 3/00
CN    107417370 A    12/2017
(Continued)

OTHER PUBLICATIONS

Wenhui Zhang et al., "Research advances on urea-formaldehyde slow-release fertilizer", Chemical Industry and Engineering Progress, 2011, vol. 30, No. S1, pp. 437-441.
(Continued)

*Primary Examiner* — Wayne A Langel

(57) ABSTRACT

A method for preparing a weathered coal-derived humic acid/urea-formaldehyde slow-release fertilizer granule by reactive extrusion process with depolymerization-activation-polycondensation trinity is provided. In an alkaline environment, paraformaldehyde is depolymerized into formaldehyde small molecules, which react with urea to form monohydroxymethylurea and dihydroxymethylurea. Under the strong shearing action of screws of the twin-screw reactive extruder, the macromolecular weathered coal-derived humic acid is depolymerized into relatively small molecule weathered coal-derived humic acid, and abundant active carboxyl groups are exposed, some of which immediately undergo dehydration condensation with —NH$_2$ on
(Continued)

the urea-formaldehyde molecule produced by the polycondensation of hydroxymethylurea during the reactive extrusion process to generate weathered coal-derived humic acid/urea-formaldehyde and its granules.

3 Claims, 9 Drawing Sheets

(51) Int. Cl.
*C05G 3/40* (2020.01)
*C05G 5/12* (2020.01)

(56) References Cited

U.S. PATENT DOCUMENTS

| | | |
|---|---|---|
| 2019/0315663 A1 | 10/2019 | Wan et al. |
| 2022/0250997 A1 | 8/2022 | Liu et al. |
| 2022/0388920 A1* | 12/2022 | Hu ............................ C05C 9/02 |

FOREIGN PATENT DOCUMENTS

| | | | | |
|---|---|---|---|---|
| CN | 110386848 A | | 10/2019 | |
| CN | 110423172 A | | 11/2019 | |
| CN | 115849959 A | | 3/2023 | |
| CN | 116332699 A | | 6/2023 | |
| CN | 116425588 A | | 7/2023 | |
| CN | 116640020 A | | 8/2023 | |
| GB | 712178 A | | 7/1954 | |
| JP | 2001-089284 A | * | 4/2001 | ............... C05G 3/10 |
| RU | 2766716 C1 | * | 3/2022 | ............. C05B 17/00 |

OTHER PUBLICATIONS

Beibei Pan et al., "Study on sythesis of urea-formaldehyde slow-release fertilizer by paraformaldehyde", Phosphate & Compound Fertilizer, 2014, vol. 29, No. 1, pp. 23-24.

* cited by examiner

METHOD FOR PREPARING WEATHERED COAL-DERIVED HUMIC ACID/UREA-FORMALDEHYDE SLOW-RELEASE FERTILIZER GRANULES BY REACTIVE EXTRUSION PROCESS WITH DEPOLYMERIZATION-ACTIVATION-POLYCONDENSATION TRINITY AND FERTILIZATION METHOD

CROSS-REFERENCE TO RELATED APPLICATIONS

This application is a continuation of International Patent Application No. PCT/CN2023/118428, filed on Sep. 13, 2023, which claims the benefit of priority from Chinese Patent Application No. 202311054388.9, filed on Aug. 22, 2023. The content of the aforementioned application, including any intervening amendments thereto, is incorporated herein by reference in its entirety.

TECHNICAL FIELD

This application relates to slow-/controlled-release fertilizers, and more particularly to a method for preparing a weathered coal-derived humic acid/urea-formaldehyde slow-release fertilizer granule by reactive extrusion process with depolymerization-activation-polycondensation trinity and a fertilization method.

BACKGROUND

Weathered coal, commonly known as outcrop coal, is formed by the weathering of lignite, bituminous coal, and anthracite, and is exposed to the surface or buried in shallow coal seams. After weathering for a long period, the weathered coal experiences extremely significant changes in its chemical and physical properties, resulting in low heat generation and loss of combustion value. However, the weathering effect also brings a large amount of regenerated humic acid and a variety of oxygen-containing functional groups in the weathered coal, so that the weathered coal has been widely used in industry, agriculture, medicine, environmental protection, and other fields.

Humic fertilizer is favored by farmers because of its advantages of high nutrient utilization efficiency, remarkable fertilizer effect and soil improvement, and significant improvement of the agricultural product quality. However, it is required to activate the weathered coal in advance to convert the bound humic acid and part of the free humic acid which are hardly absorbable by crops into water-soluble humic acid. The additional activation process increases cost and environmental risks in the application of the weathered coal-derived humic acid (YHA), thus limiting the popularization of YHA.

Urea-formaldehyde (UF) fertilizer is the first successfully-developed and commercialized biodegradable polymer slow-/controlled-release fertilizer. UF can be slowly degraded under the action of microorganisms to gradually release nitrogen nutrient. Compared to the traditional fertilizers, UF fertilizers will not increase the comprehensive application cost and has higher utilization efficiency of nitrogen. Moreover, it is only required to be applied once without topdressing, and thus can achieve the fertilizer saving and efficiency improvement. In addition, UF fertilizers can also promote the formation of soil aggregates, improve soil permeability, and improve the root penetration ability of crops, and thus have become the most promising slow-/controlled-release fertilizers. However, the existing UF fertilizers are mostly prepared from an aqueous formaldehyde solution, which is limited by difficult transportation, poor storage stability, and strong odor. Additionally, the liquid-phase synthesis is difficult to control, resulting in excessive polymerization rate, poor machinability, and high price. It has been reported about the preparation of UF through the reaction of solid paraformaldehyde and urea. However, the short reaction time between solid phases will result in a high initial nitrogen release rate. In addition, the nitrogen release rates of the low-polymerization-degree components in the all current UF fertilizer varieties are higher than the nitrogen demands of the crop growth at an early stage, and the nitrogen release rates of the high-polymerization-degree components are lower than the nitrogen demands of the crop growth at middle and later stages. Therefore, in the practical application, the nutrient release period of UF is too long, and is often longer than the period required for the crop growth. In view of these problems, though UF has a higher nitrogen content than other commercially-available fertilizer products, the popularization of UF polymers as slow-release/controlled-release fertilizers is still limited.

Reactive extrusion has become an emerging polymer forming technology in recent years, in which the polymerization and processing processes are combined, and the chemical reaction and continuous production are simultaneously carried out in a processing machinery. Regarding the reactive extrusion, an extruder is used as a reaction vessel, and a plasticization-extrusion system composed of a screw and a barrel is used as a continuous reactor. Various raw material components for pre-reaction, such as monomers, initiators, polymers, and additives, are fed into the barrel once or in batches through the same feeding port or different feeding ports. The processes of mixing, conveying, plasticization, reaction, and extrusion of raw materials from a die head are completed through the screw rotation. The reactive extrusion has low investment and cost, no or little use of solvents harmful to humans and environment, readily-available raw materials, simplified volatile removal, granulation and molding processes, high reaction efficiency, and uniform product performance, and thus has a brilliant application prospect in the continuous large-scale production.

SUMMARY

In order to improve the nitrogen utilization efficiency and reduce production cost of urea-formaldehyde slow-release fertilizers, this application provides a method for preparing a weathered coal-derived humic acid/urea-formaldehyde slow-release fertilizer granule by reactive extrusion process with depolymerization-activation-polycondensation trinity and a fertilizing method.

This application provides a method for preparing a weathered coal-derived humic acid/urea-formaldehyde slow-release fertilizer granule by reactive extrusion process with depolymerization-activation-polycondensation trinity, comprising:

(1) adding urea, paraformaldehyde, and water to a reactor followed by pH adjustment and reaction at a certain temperature for a certain period of time to obtain a hydroxymethylurea solution;

(2) adding a weathered coal-derived humic acid and an alkaline activator to the hydroxymethylurea solution obtained in the step (1) followed by reaction at a certain temperature for a certain period of time to obtain a reaction mixture;

(3) sealing a die orifice between a reaction unit and an extrusion unit of a reaction-extrusion integrated machine; and adjusting a pH of the reaction mixture obtained in the step (2) followed by feeding to a twin-screw reactive extruder of the reaction unit of the reaction-extrusion integrated machine;

(4) starting screws of the twin-screw reactive extruder and simultaneously starting a vacuumization-devolatilization device of the twin-screw reactive extruder to remove moisture from the reaction mixture, and reacting the reaction mixture at a preset temperature and a preset screw rotation speed for a certain period of time; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde are carried out simultaneously;

(5) opening the die orifice between the reaction unit and the extrusion unit, and starting a twin-screw extruder of the extrusion unit such that a reaction product obtained in the step (4) is delivered by the twin-screw reactive extruder of the reaction unit to the twin-screw extruder of the extrusion unit; and extruding the reaction product at a preset temperature and a preset screw rotation speed through the twin-screw extruder to obtain a strip product; and (6) drying the strip product obtained in the step (5) at a preset temperature followed by granulation to obtain the weathered coal-derived humic acid/urea-formaldehyde slow-release fertilizer in a cylindrical particle form with good particle shape.

Those skilled in the art can also prepare various weathered coal-derived humic acid/urea-formaldehyde slow-release fertilizer granules with different nitrogen contents according to different demands by controlling an addition of urea, paraformaldehyde, and weathered coal-derived humic acid.

In an embodiment, in the step (1), a mass ratio of urea to paraformaldehyde is 2-4:1, and an addition of water is 10-50% of a total mass of urea and paraformaldehyde.

In an embodiment, in the step (1), a pH of the system is adjusted to 8-12 to react at 30-80° C. for 1-3 h.

In an embodiment, in the step (2), the weathered coal-derived humic acid is 10-50% of the total mass of urea and paraformaldehyde; and the alkaline activator is 0-10% of a mass of weathered coal-derived humic acid.

In an embodiment, in the step (2), after the weathered coal-derived humic acid and the alkaline activator are added, the reaction is performed at 30-80° C. for 5-30 min.

In an embodiment, in the step (3), the reaction mixture is adjusted to pH 3-5.

In an embodiment, in the step (4), a temperature of the twin-screw reactive extruder of the reaction unit is 50-90° C., the screw rotation speed of the twin-screw reactive extruder is 50-150 rpm, and the reaction time is 10-30 min.

In an embodiment, in the step (5), the extrusion temperature of the twin-screw extruder of the extrusion unit is 50-90° C. and the screw rotation speed of the twin-screw extruder is 50-150 rpm.

This application provides a fertilization method, comprising:

applying, by a sowing-fertilization machine, the weathered coal-derived humic acid/urea-formaldehyde slow-release fertilizer in a cylindrical particle form prepared by the above method while performing sowing.

In an embodiment, an application amount of the weathered coal-derived humic acid/urea-formaldehyde slow-release fertilizer granules is 8-15 kg of nitrogen per mu.

Compared to the prior art, the present disclosure has the following beneficial effects.

(1) The present disclosure uses the weathered coal-derived humic acid with advantages of wide distribution, large reserves, and low price to modify urea-formaldehyde, which can not only improve the strength of urea-formaldehyde fertilizer granules and improve its slow-release performance, but also greatly reduce the preparation cost of urea-formaldehyde and realize effective utilization of waste coal-based material.

(2) The present disclosure uses paraformaldehyde to replace a formaldehyde aqueous solution, which avoids problems of transportation difficulty and storage danger of the formaldehyde aqueous solution, and solves problems of a high initial nitrogen release rate of urea-formaldehyde prepared by melt polycondensation reaction of solid paraformaldehyde and urea.

(3) The present disclosure can carry out depolymerization and activation reactions of weathered coal-derived humic acid, a polycondensation that generating urea-formaldehyde from hydroxymethylurea and a dehydration-condensation reaction between the generated activated weathered coal-derived humic acid and the generated urea-formaldehyde at the same time in the twin-screw reactive extruder, so as to avoid a single activating reaction process of weathered coal-derived humic acid and a large amount of activation waste generated by the process. Therefore, it saves manpower and material resources and avoids environmental pollution. And a trinity reaction has advantages of low cost, green, efficiency and stability.

(4) At present, an extensive crushing granulation method is still widely used in a granulation of urea-formaldehyde fertilizers, which has disadvantages of excessive dust, environmental pollution, and irregular particle shape. The present disclosure adopts a reactive extrusion granulation technology which has advantages of continuous large-scale production, low investment and cost, simplified removal of volatiles from polymers, high reaction efficiency, and uniform product performance. Therefore, it has advantages of simple process, no dust pollution, continuous production, manpower saving, and material resources saving.

(5) Compared to the traditional urea-formaldehyde fertilizers, the present disclosure introduces weathered coal-derived humic acid and makes its molecules enter a main chain of urea-formaldehyde molecules, so as to reduce nitrogen nutrient release rate at an early stage of crop growth of the urea-formaldehyde fertilizer and improve the nitrogen nutrient release rate at a middle and later stages of crop growth through reducing production of soluble low-polymerization-degree urea-formaldehyde and destroying the regular arrangement degree of urea-formaldehyde macromolecular chain. In addition, the mechanical properties of the prepared weathered coal-derived humic acid/urea-formaldehyde slow-release fertilizer granules are greatly improved, and its compressive strength is more than 1.67 times that of the urea-formaldehyde slow-release nitrogen fertilizer prepared by the same process. On the one hand, it can avoid particle from breaking in a process of storage, transportation and application. On the other hand, it can be used at the same time when seeding with the sowing-fertilization machine, which saves labor, time, fertilizer, and effort.

BRIEF DESCRIPTION OF THE DRAWINGS

The drawings provided herein are incorporated into the specification and form a part of the specification, showing embodiments conforming to the present disclosure, and are used to illustrate the present disclosure together with the specification.

In order to illustrate the technical solutions in the embodiments of the present disclosure or the prior art more clearly, the accompanying drawings needed in description of the embodiments or prior art will be briefly introduced below. It is obvious that those of ordinary skill in the art can obtain other drawings according to the accompanying drawings without making any creative effort.

DETAILED DESCRIPTION OF EMBODIMENTS

Figure 1:
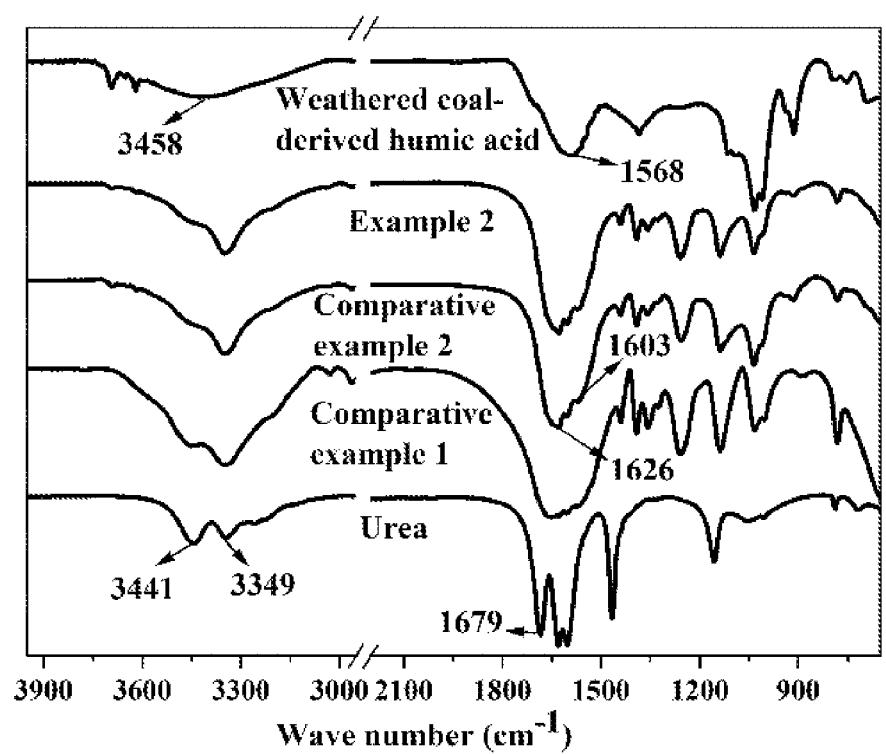
FIG. 1 shows Fourier transform infrared (FT-IR) spectra of weathered coal-derived humic acid (YHA), YHA/urea-formaldehyde (UF) slow-release fertilizer prepared in Example 2 of the present disclosure, a mixture of YHA and UF prepared in Comparative example 2, and a UF slow-release fertilizer prepared in Comparative example 1.

The present disclosure will be further described below to facilitate understanding of purposes, features and advantages of the present disclosure. It should be understood that the embodiments and features thereof can be combined with each other in the absence of contradiction.

Many details will be described below to facilitate understanding of the present disclosure, but the present disclosure can also be implemented in other ways different from those described herein. It is obvious that provided herein are only several embodiments of the present disclosure, and are not intended to limit the disclosure.

This application provides a method for preparing a weathered coal-derived humic acid/urea-formaldehyde slow-release fertilizer granule by reactive extrusion process with depolymerization-activation-polycondensation trinity, which is performed as follows.

(1) Urea, paraformaldehyde, and water are added to a reactor, and subjected to pH adjustment and reaction at a certain temperature for a certain period of time to obtain a hydroxymethylurea solution.

(2) The hydroxymethylurea solution obtained in the step (1) is added with weathered coal-derived humic acid and an alkaline activator, and reacted at a certain temperature for a certain period of time to obtain a reaction mixture.

(3) A die orifice between a reaction unit and an extrusion unit of a reaction-extrusion integrated machine is sealed. The reaction mixture obtained in the step (2) is adjusted in pH, and fed into a twin-screw reactive extruder of the reaction unit of the reaction-extrusion integrated machine.

(4) Screws of the twin-screw reactive extruder are started simultaneously with its vacuumization-devolatilization device to remove moisture from the reaction mixture, and the reaction mixture is reacted at a preset temperature and a preset screw rotation speed for a certain period of time; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde are carried out simultaneously.

(5) The die orifice between the reaction unit and the extrusion unit is opened, and a twin-screw extruder of the extrusion unit is started. A reaction product obtained in the step (4) is delivered by the twin-screw reactive extruder of the reaction unit to the twin-screw extruder of the extrusion unit, and extruded at a preset temperature and a preset screw rotation speed through the twin-screw extruder to obtain a strip product.

(6) The strip product obtained in the step (5) is dried at a preset temperature and granulated to obtain a weathered coal-derived humic acid/urea-formaldehyde slow-release fertilizer in a cylindrical particle form with good particle shape.

The reaction-extrusion integrated machine includes a reaction unit and an extrusion unit. The twin-screw reactive extruder of the reaction unit and the twin-screw extruder of the extrusion unit are well-known devices in the art to which this application pertains. A discharging die orifice of the twin-screw reactive extruder is communicated with a feeding die orifice of the twin-screw extruder. In addition, the vacuumization-devolatilization device is provided on the twin-screw reactive extruder, and is connected with the twin-screw reactive extruder in a well-known way. In embodiments of the present disclosure, screws of the twin-screw reactive extruder of the reaction unit have a diameter of 28 mm and a length-to-diameter ratio of 34:1, and screws of the twin-screw extruder of the extrusion unit have a diameter of 21 mm and a length-to-diameter ratio of 36:1.

In an embodiment, in the step (1), a mass ratio of urea to paraformaldehyde is 2-4:1, and an addition of water is 10-50% of a total mass of urea and paraformaldehyde. A chemical formula of paraformaldehyde in this embodiment is $(CH_2O)_n$, and n=8-12. In an embodiment, the mass ratio of urea to paraformaldehyde is 2.4-3:1, and the water is 15-30% of the total mass of urea and paraformaldehyde.

In an embodiment, in the step (1), a pH of a system is adjusted to 8-12 to react at 30-80° C. for 1-3 h. In an embodiment, the pH of the system is adjusted to 9-11 to react at 50-70° ° C. for 1.5-2.0 h.

In an embodiment, in the step (2), an addition of weathered coal-derived humic acid is 10-50% of the total mass of urea and paraformaldehyde, and an addition of the alkaline activator is 0-10% of a mass of weathered coal-derived humic acid. In an embodiment, the addition of weathered coal-derived humic acid is 25-40% of the total mass of urea and paraformaldehyde, and the addition of the alkaline activator is 5-10% of the mass of weathered coal-derived humic acid.

In an embodiment, the alkaline activator is potassium hydroxide or sodium hydroxide. In the present disclosure, a function of the alkaline activator is to improve alkalinity of the system which is originally alkaline. And the alkaline activator cooperates with a strong shearing action of the screws of the twin-screw reactive extruder, so that macromolecular weathered coal-derived humic acid in the system is depolymerization into relative small molecular weathered coal-derived humic acid, and a large amount of active carboxyl group is exposed.

In an embodiment, in the step (2), after the weathered coal-derived humic acid and the alkaline activator are added, the reaction is performed at 30-80° C. for 5-30 min. In embodiment, after the weathered coal-derived humic acid and the alkaline activator are added, the reaction is performed at 50-70° C. for 10-20 min.

In an embodiment, in the step (3), the reaction mixture is adjusted to pH 3-5.

In an embodiment, in the step (4), a temperature of the twin-screw reactive extruder of the reaction unit is 50-90° C., a screw rotation speed of screws of the twin-screw reactive extruder is 50-150 rpm, and reaction time is 10-30 min. In an embodiment, the temperature of the twin-screw reactive extruder of the reaction unit is 60-80° ° C., the screw rotation speed of screws of the twin-screw reactive extruder is 60-100 rpm, and the reaction time is 15-25 min.

In an embodiment, in the step (5), a temperature of the twin-screw extruder of the extrusion unit is 50-90° C. and a screw rotation speed of the twin-screw extruder is 50-150 rpm. In an embodiment, the temperature of the twin-screw extruder of the extrusion unit is 50-70° C. and the screw rotation speed of the twin-screw extruder is 60-80 rpm.

In an embodiment, in the step (6), a drying temperature of the strip product is 60-80° C.

The present disclosure also provides a fertilization method, in which the weathered coal-derived humic acid/urea-formaldehyde slow-release fertilizer in a cylindrical particle form prepared by the above method is applied by a sowing-fertilization machine while the sowing is performed.

In an embodiment, an application amount of the weathered coal-derived humic acid/urea-formaldehyde slow-release fertilizer in a cylindrical particle form is 8-15 kg of nitrogen per mu.

The present disclosure will be further described below with reference to embodiments.

Example 1

Provided herein was a method for preparing a weathered coal-derived humic acid/urea-formaldehyde slow-release fertilizer granule by reactive extrusion process with depolymerization-activation-polycondensation trinity, including the following steps.

(1) Urea (U), paraformaldehyde (Pf), and water ($H_2O$) were added to a reactor, and the reaction system was adjusted to pH 8 and reacted at 70° C. for 2 h to obtain a hydroxymethylurea (MU) solution, where a mass ratio of urea to paraformaldehyde was 2.6:1, and the water was 15% of the total mass of urea and paraformaldehyde.

(2) The hydroxymethylurea solution obtained in the step (1) was added with weathered coal-derived humic acid (YHA) and solid potassium hydroxide (KOH), and reacted at 70° C. for 10 min to obtain a reaction mixture, where the weathered coal-derived humic acid was 25% of the total mass of urea and paraformaldehyde, and the solid KOH was 10% of a mass of the weathered coal-derived humic acid.

(3) The die orifice between a reaction unit and an extrusion unit of a reaction-extrusion integrated machine was sealed. The reaction mixture obtained in the step (2) was adjusted to pH 5, and then fed into the twin-screw reactive extruder of the reaction unit of the reaction-extrusion integrated machine.

(4) Screws of the twin-screw reactive extruder were started simultaneously with its vacuumization-devolatilization device to remove moisture from the reaction mixture, and the reaction mixture was reacted at 60° C. and 60 rpm for 30 min; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde were carried out simultaneously.

(5) The die orifice between the reaction unit and the extrusion unit was opened, and the twin-screw extruder of the extrusion unit was started. The reaction product obtained in the step (4) was delivered by the twin-screw reactive extruder of the reaction unit to the twin-screw extruder of the extrusion unit, and extruded at 50° C. and 50 rpm through the twin-screw extruder to obtain a strip product.

(6) The strip product obtained in the step (5) was dried at 80° C. and granulated to obtain a weathered coal-derived humic acid/urea-formaldehyde slow-release fertilizer in a cylindrical particle form (HAUF) with good particle shape. The HAUF had a compressive strength of 3.52 MPa, a nitrogen (N) content of 29.56 wt. %, and an initial nitrogen release rate of 20.13%. When planting corn, the fertilizer is applied according to an application amount of 50.7 kg/mu by a sowing-fertilization machine.

Example 2

Provided herein was a method for preparing a weathered coal-derived humic acid/urea-formaldehyde slow-release fertilizer granule by reactive extrusion process with depolymerization-activation-polycondensation trinity, including the following steps.

(1) Urea (U), paraformaldehyde (Pf), and water ($H_2O$) were added to a reactor, adjusted to pH 8 and reacted at 70° C. for 2 h to obtain a hydroxymethylurea (MU) solution, where a mass ratio of urea to paraformaldehyde was 2.6:1, and the water was 15% of the total mass of urea and paraformaldehyde.

(2) The hydroxymethylurea solution obtained in the step (1) was added with weathered coal-derived humic acid (YHA) and solid potassium hydroxide (KOH), and reacted at 70° ° C. for 10 min to obtain a reaction mixture, where the weathered coal-derived humic acid was 43% of the total mass of urea and paraformaldehyde, and the solid KOH was 10% of the mass of the weathered coal-derived humic acid.

(3) The die orifice between a reaction unit and an extrusion unit of a reaction-extrusion integrated machine was sealed. The reaction mixture obtained in the step (2) was adjusted to pH 5, and then fed into the twin-screw reactive extruder of the reaction unit of the reaction-extrusion integrated machine.

(4) Screws of the twin-screw reactive extruder were started simultaneously with its vacuumization-devolatilization device to remove moisture from the reaction mixture, and the reaction mixture was reacted at 60° C. and 60 rpm for 30 min; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde are carried out simultaneously.

(5) The die orifice between the reaction unit and the extrusion unit was opened, and the twin-screw extruder of the extrusion unit was started. The reaction product obtained in the step (4) was delivered by the twin-screw reactive extruder of the reaction unit to the twin-screw extruder of the extrusion unit, and extruded at 50° C. at 50 rpm through the twin-screw extruder to obtain the strip product.

(6) The strip product obtained in the step (5) was dried at 80° C. and granulated to obtain a weathered coal-derived humic acid/urea-formaldehyde slow-release fertilizer in a cylindrical particle form (HAUF) with good particle shape.

The HAUF had a compressive strength of 4.14 MPa, a N content of 25.86 wt. %, and an initial nitrogen release rate of 15.92%. When planting corn, the fertilizer was applied by a sowing-fertilization machine according to an application amount of 58 kg/mu.

Example 3

Provided herein was a method for preparing a weathered coal-derived humic acid/urea-formaldehyde slow-release fertilizer granule by reactive extrusion process with depolymerization-activation-polycondensation trinity, including the following steps.

(1) Urea (U), paraformaldehyde (Pf), and water ($H_2O$) were added to a reactor, adjusted to pH 8 and reacted at 30° C. for 3 h to obtain a hydroxymethylurea (MU) solution, where a mass ratio of urea to paraformaldehyde was 2:1, and the water was 10% of the total mass of urea and paraformaldehyde.

(2) The hydroxymethylurea solution obtained in the step (1) was added with weathered coal-derived humic acid (YHA), and reacted at 30° C. for 5 min to obtain a reaction mixture, where the weathered coal-derived humic acid was 10% of the total mass of urea and paraformaldehyde.

(3) The die orifice between a reaction unit and an extrusion unit of a reaction-extrusion integrated machine was sealed. The reaction mixture obtained in the step (2) was adjusted to pH 3, and then fed into the twin-screw reactive extruder of the reaction unit of the reaction-extrusion integrated machine.

(4) Screws of the twin-screw reactive extruder were started simultaneously with its vacuumization-devolatilization device to remove moisture from the reaction mixture, and the reaction mixture was reacted at 50° C. and 50 rpm for 10 min; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde were carried out simultaneously.

(5) The die orifice between the reaction unit and the extrusion unit was opened, and the twin-screw extruder of the extrusion unit was started. The reaction product obtained in the step (4) was delivered by the twin-screw reactive extruder of the reaction unit to the twin-screw extruder of the extrusion unit, and extruded at 50° C. and 50 rpm through the twin-screw extruder to obtain a strip product.

(6) The strip product obtained in the step (5) was dried at 60° C. and granulated to obtain a weathered coal-derived humic acid/urea-formaldehyde slow-release fertilizer in a cylindrical particle form (HAUF) with good particle shape.

The HAUF had a compressive strength of 3.68 MPa, a N content of 29.76 wt. %, and an initial nitrogen release rate of 4.52%. When planting corn, the fertilizer is applied by a sowing-fertilization machine according to the application amount of 50.4 kg/mu.

Example 4

Provided herein was a method for preparing a weathered coal-derived humic acid/urea-formaldehyde slow-release fertilizer granule by reactive extrusion process with depolymerization-activation-polycondensation trinity, including the following steps.

(1) Urea (U), paraformaldehyde (Pf), and water ($H_2O$) were added to a reactor, adjusted to pH 12 and react at 80° C. for 1 h to obtain a hydroxymethylurea (MU) solution, where a mass ratio of urea to paraformaldehyde was 4:1, and the water was 50% of the total mass of urea and paraformaldehyde.

(2) The hydroxymethylurea solution obtained in the step (1) was added with weathered coal-derived humic acid (YHA), and reacted at 80° C. for 30 min to obtain a reaction mixture, where the weathered coal-derived humic acid was 30% of the total mass of urea and paraformaldehyde.

(3) The die orifice between a reaction unit and an extrusion unit of a reaction-extrusion integrated machine was sealed. The reaction mixture obtained in the step (2) was adjusted to pH 3, and then fed into the twin-screw reactive extruder of the reaction unit of the reaction-extrusion integrated machine.

(4) Screws of the twin-screw reactive extruder were started simultaneously with its vacuumization-devolatilization device to remove moisture from the reaction mixture, and the reaction mixture was reacted at 90° C. and 150 rpm for 30 min; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde were carried out simultaneously.

(5) The die orifice between the reaction unit and the extrusion unit was opened, and the twin-screw extruder of the extrusion unit was started. The reaction product obtained in the step (4) was delivered by the twin-screw reactive extruder of the reaction unit to the twin-screw extruder of the extrusion unit, and extruded at 90° C. and 150 rpm through the twin-screw extruder to obtain a strip product.

(6) The strip product obtained in the step (5) was dried at 80° C. and granulated to obtain a weathered coal-derived humic acid/urea-formaldehyde slow-release fertilizer in a cylindrical particle form (HAUF) with good particle shape.

The HAUF had a compressive strength of 3.72 MPa, a N content of 31.45 wt. %, and an initial nitrogen release rate of 20.75%. When planting corn, the fertilizer is applied by a sowing-fertilization machine according to the application amount of 47.7 kg/mu.

Example 5

Provided herein was a method for preparing a weathered coal-derived humic acid/urea-formaldehyde slow-release fertilizer granule by reactive extrusion process with depolymerization-activation-polycondensation trinity, including the following steps.

(1) Urea (U), paraformaldehyde (Pf), and water ($H_2O$) were added to the reactor, adjusted to pH 8 and react at 70° C. for 2 h to obtain a hydroxymethylurea (MU) solution, where a mass ratio of urea to paraformaldehyde was 2.6:1, and the water was 15% of the total mass of urea and paraformaldehyde.

(2) The hydroxymethylurea solution obtained in the step (1) was added with weathered coal-derived humic acid (YHA) and reacted at 70° C. for 10 min to obtain a reaction mixture, where the weathered coal-derived humic acid was 43% of the total mass of urea and paraformaldehyde.

(3) The die orifice between a reaction unit and an extrusion unit of a reaction-extrusion integrated machine was sealed. The reaction mixture obtained in the step (2) was adjusted to pH 5, and then fed into the twin-screw reactive extruder of the reaction unit of the reaction-extrusion integrated machine.

(4) Screws of the twin-screw reactive extruder were started simultaneously with its vacuumization-devolatilization device to remove moisture from the reaction mixture, and the reaction mixture was reacted at 60° C. and 60 rpm for 30 min; during this process, the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde were carried out simultaneously.

(5) The die orifice between the reaction unit and the extrusion unit was opened, and the twin-screw extruder of the extrusion unit was started. The reaction product obtained in the step (4) was delivered by the twin-screw reactive extruder of the reaction unit to the twin-screw extruder of the extrusion unit, and extruded at 50° C. and 50 rpm through the twin-screw extruder to obtain a strip product.

(6) The strip product obtained in the step (5) was dried at 80° C. and granulated to obtain a weathered coal-derived humic acid/urea-formaldehyde slow-release fertilizer in a cylindrical particle form (HAUF) with good particle shape. The HAUF had a compressive strength of 3.62 MPa, a N content of 26.84 wt. %, and an initial nitrogen release rate of 19.33%. When planting corn, the fertilizer is applied by a sowing-fertilization machine according to the application amount of 56 kg/mu Comparative Example 1

Provided herein was a method for preparing urea-formaldehyde slow-release fertilizer by reactive extrusion, including the following steps.

(1) Urea (U), paraformaldehyde (Pf), and water ($H_2O$) were added to a reactor, adjusted to pH 8 and reacted at 70° C. for 2 h to obtain a hydroxymethylurea (MU) solution, where the mass ratio of urea to paraformaldehyde was 2.6:1, and the water was 15% of the total mass of urea and paraformaldehyde.

(2) The die orifice between a reaction unit and an extrusion unit of a reaction-extrusion integrated machine was sealed. The MU solution obtained in the step (1) was adjusted to pH 5, and then fed into the twin-screw reactive extruder of the reaction unit of the reaction-extrusion integrated machine.

(3) Screws of the twin-screw reactive extruder were started simultaneously with its vacuumization-devolatilization device to remove moisture from the reaction mixture, and the reaction mixture was reacted at 60° C. and 60 rpm for 30 min; during this process, the condensation reaction of the hydroxymethylurea to generate urea-formaldehyde was carried out.

(4) The die orifice between the reaction unit and the extrusion unit was opened, and the twin-screw extruder of the extrusion unit was started. The reaction product obtained in the step (3) was delivered by the twin-screw reactive extruder of the reaction unit to the twin-screw extruder of the extrusion unit, and extruded at 50° C. and 50 rpm through the twin-screw extruder to obtain a strip product.

(5) The strip product obtained in the step (4) was dried at 80° ° C. and granulated to obtain a urea-formaldehyde slow-release fertilizer in a cylindrical particle (UF) with good particle shape.

The UF had a compressive strength of 2.48 MPa, a N content of 36.94 wt. %, and an initial nitrogen release rate of 24.60%.

Comparative Example 2

Provided herein was a method for preparing a mixture of weathered coal-derived humic acid and urea-formaldehyde slow-release fertilizer by reactive extrusion, including the following steps.

(1) Urea (U), paraformaldehyde (Pf), and water ($H_2O$) were added to a reactor, adjusted to pH 8 and reacted at 70° C. for 2 h to obtain a hydroxymethylurea (MU) solution, where a mass ratio of urea to paraformaldehyde was 2.6:1, and the water was 15 wt. % of the total mass of urea and paraformaldehyde.

(2) The die orifice between a reaction unit and an extrusion unit of a reaction-extrusion integrated machine was sealed. The MU solution obtained in the step (1) was adjusted to pH 5, and then fed into the twin-screw reactive extruder of the reaction unit of the reaction-extrusion integrated machine.

(3) Screws of the twin-screw reactive extruder were started simultaneously with its vacuumization-devolatilization device to remove moisture, and the MU solution was reacted at 60° C. and 60 rpm for 30 min; during this process, the condensation reaction of the hydroxymethylurea to generate urea-formaldehyde was carried out.

(4) Weathered coal-derived humic acid (YHA) and solid potassium hydroxide (KOH) were fed into the twin-screw reactive extruder of the reaction unit to be mixed with a product obtained in the step (3), where the weathered coal-derived humic acid was 43% of a total mass of urea and paraformaldehyde, and the solid KOH was 10% of a mass of the weathered coal-derived humic acid. The reaction mixture was reacted at 60° C. and 60 rpm for 10 min.

(5) The die orifice between the reaction unit and the extrusion unit was opened, and the twin-screw extruder of the extrusion unit was started. The reaction product obtained in the step (4) was delivered by the twin-screw reactive extruder of the reaction unit to the twin-screw extruder of the extrusion unit, and extruded at 50° C. and 50 rpm through the twin-screw extruder to obtain a strip product.

(6) The strip product was dried at 80° C. and granulated to obtain the mixture of weathered coal-derived humic acid and urea-formaldehyde in a cylindrical particle form.

The weathered coal-derived humic acid/urea formaldehyde mixture had a compressive strength of 3.13 MPa, a N content of 25.86 wt. %, and an initial nitrogen release rate of 18.26%.

Performance test and characterization of the present disclosure were performed as follows.

(1) Cylindrical particles were ground, smashed, and sieved by a 0.25 mm sieve to obtain test sample powder. A small amount of dried powder KBr (potassium bromide) was tabletted, and an infrared spectrogram was obtained by a Nicolet IS50 infrared spectrometer at room temperature with a scanning range of 500-4000 $cm^{-1}$. An X-ray diffractometer (HAOYUAN DX-2700B) was used to analyze the test sample powder with a scanning range of 5-80°. Under nitrogen atmosphere, a thermal gravimetric analyzer (TA Q50) was used to test thermal stability of the test sample powder with a temperature range of 30-800° C., which had a heating rate of 10° C./min and a nitrogen flow rate of 40 mL/min.

(2) Compressive strength test: A universal testing machine (MTS CMT5105) was used to test. The cylindrical particles were placed on the universal testing machine and compressed in a longitudinal direction with pressure of 20000 kgf and a compression rate of 1 mm/min.

(3) Slow-release performance test: A slow-release performance and an initial release rate of nitrogen nutrient were characterized by a still water release test. Fertilizer particles of 5.00 g were weighted, packed and sealed in a 100 mesh nylon bag, and then was put in a culture bottle filled with 100 mL deionized water and cultured in a 25° C. constant temperature water bath. Samples were collected respectively on day 1, 3, 5, 7, 10, 14 and 28. When sampling, the nylon bag was placed on a mouth of the bottle by a pair of tweezers to remove drain water until no water dripping, and the nylon bag was put in another culture bottle filled with 100 mL deionized water to continue to culture. The original culture bottle was turned upside down to ensure concentration of an internal solution is consistent. The internal solution of 20 mL was taken to measure nitrogen content by a sulfuric acid-hydrogen peroxide digestion method and a Kjeldahl determination and calculated a cumulative release rate of nutrient. And a test result of the 1st day was the initial release rate.

FIG. 1 shows Fourier transform infrared (FT-IR) spectra within a region of 4000 $cm^{-1}$-500 $cm^{-1}$ of weathered coal-derived humic acid (YHA), weathered coal-derived humic acid/urea-formaldehyde slow-release fertilizer prepared in Example 2 of the present disclosure, a mixture of weathered coal-derived humic acid and urea-formaldehyde prepared in Comparative example 2, and urea formaldehyde slow-release fertilizer prepared in Comparative example 1. In the figure, the peak at 3458 $cm^{-1}$ is attributed to the stretching vibration of —OH in the weathered coal structure; peaks at 1626 $cm^{-1}$ and 1603 $cm^{-1}$ are respectively attributed to the stretching vibration of —$NH_2$ and —NH— of urea-formaldehyde. Both the weathered coal-derived humic acid/urea-formaldehyde slow-release fertilizer prepared in Example 2 and the mixture of weathered coal-derived humic acid and urea-formaldehyde prepared in Comparative example 2 have characteristic peaks of YHA and the urea formaldehyde slow-release fertilizer prepared in Comparative example 1, which prove that products of the Example 2 and the Comparative example 2 are both composed of weathered coal-derived humic acid and urea-formaldehyde.

Figure 2:
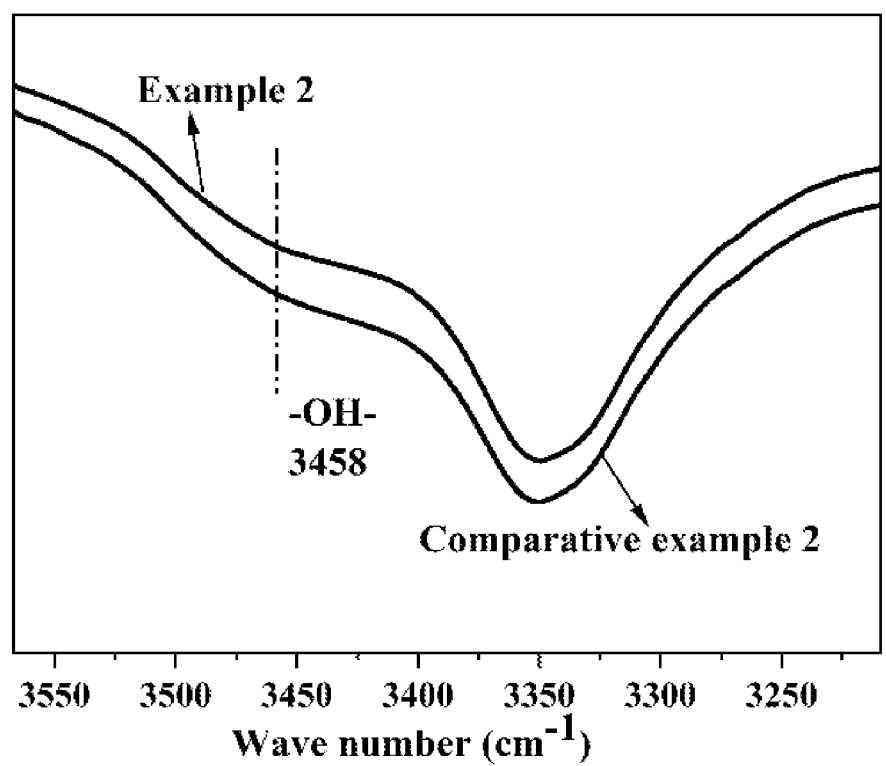
FIG. 2 is an enlarged view of FT-IR spectra of the YHA/UF slow-release fertilizer prepared in Example 2 of the present disclosure and the mixture of YHA and UF prepared in the Comparative example 2 at 3458 cm$^{-1}$ in FIG. 1.

FIG. 2 is an enlarged view of the FT-IR spectra of the weathered coal-derived humic acid/urea-formaldehyde slow-release fertilizer (HAUF) prepared in Example 2 and the mixture of weathered coal-derived humic acid and urea-formaldehyde prepared in Comparative example 2 at 3458 $cm^{-1}$ after normalization. It can be observed from FIG. 2 that intensities of absorption peaks of —OH in the weathered coal-derived humic acid (YHA) of the slow-release fertilizer in Example 2 are significantly weaker compared with those of the mixture in Comparative example 2, which indicates that different from the mixture prepared in Comparative example 2, —OH of the weathered coal-derived humic acid is dehydrated with the acylamino group of urea-formaldehyde in Example 2, resulting in weakened peak intensity of —OH. The FT-IR spectra shows that weathered coal-derived humic acid entered a main chain of urea-formaldehyde molecule through a reaction between —COOH (carboxyl group) in the macromolecular chain of weathered coal-derived humic acid and —$NH_2$ of urea-formaldehyde molecule chain by reactive extrusion.

Figure 3:
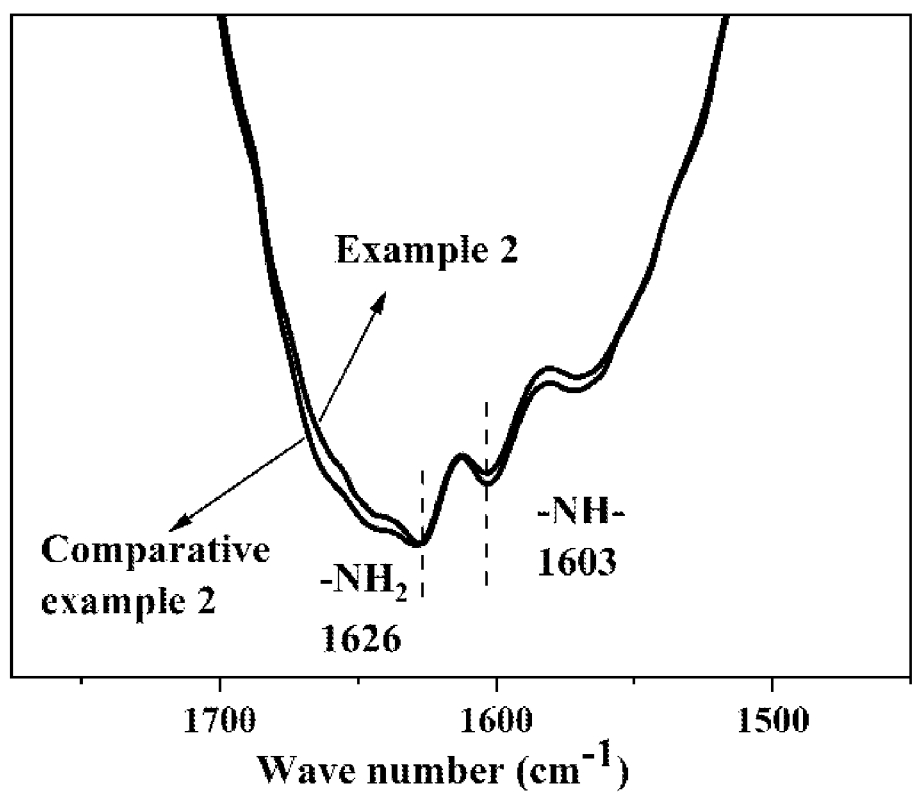
FIG. 3 is an enlarged view of FT-IR spectra of the YHA/UF slow-release fertilizer prepared in Example 2 of the present disclosure and the mixture of YHA and UF prepared in Comparative example 2 at 1626 cm$^{-1}$ in FIG. 1.

FIG. 3 is an enlarged view of the FT-IR spectra of the slow-release fertilizer prepared in Example 2 and the mixture prepared in Comparative example 2 of the —$NH_2$ stretching vibration peak at 1626 $cm^{-1}$ after normalization. In the FIG. 3, compared with the mixture of Comparative example 2, the slow-release fertilizer in Example 2 has a significantly enhanced intensity of the absorption peak at 1603 $cm^{-1}$ assigned to the —$NH_2$ of urea-formaldehyde, which is corresponding to the weakening of the —COOH absorption peak illustrated in the FIG. 2, indicating that the —COOH of the weathered coal-derived humic acid undergoes a dehydration reaction with the acylamino group of urea-formaldehyde.

The FT-IR spectra demonstrate that the weathered coal-derived humic acid molecules enter the main chains of the urea-formaldehyde molecules.

Figure 4:
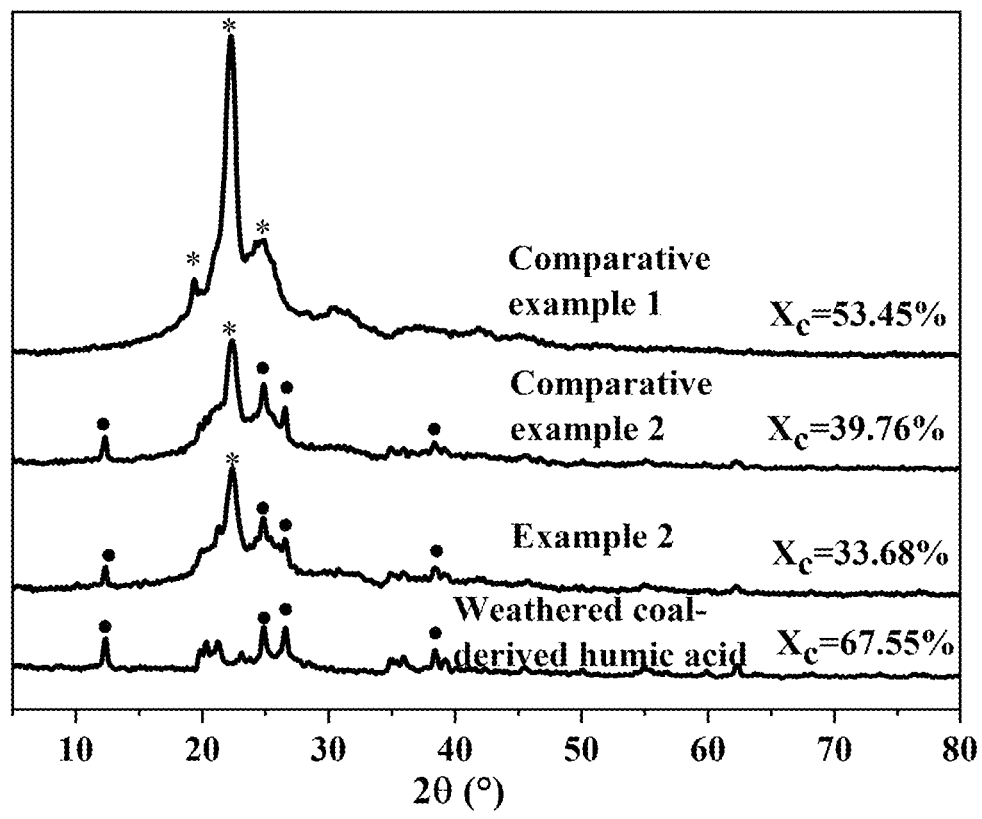
FIG. 4 shows X-ray diffraction (XRD) patterns of the YHA/UF slow-release fertilizer prepared in Example 2 of the present disclosure, the UF slow-release fertilizer prepared in Comparative example 1, the mixture of YHA and UF prepared in Comparative example 2, and the YHA.

FIG. 4 shows X-ray diffraction (XRD) patterns of the weathered coal-derived humic acid/urea-formaldehyde slow-release fertilizer prepared in Example 2, the urea formaldehyde slow-release fertilizer (UF) prepared in Comparative example 1, the mixture of weathered coal-derived humic acid and urea-formaldehyde prepared in Comparative example 2, and the weathered coal-derived humic acid (YHA). In the FIG. 4, the characteristic peaks of 12.3°, 24.9°, 26.5°, and 38.5° are the characteristic diffraction peaks of YHA, and the characteristic peaks of 19.4°, 22.2°, and 24.8° are the characteristic diffraction peaks of UF. Typical characteristic peaks of YHA and UF are appeared in the weathered coal-derived humic acid/urea-formaldehyde slow-release fertilizer. In addition, it's not difficult to find that the crystallinities of the mixture prepared in Comparative example 2 and the slow-release fertilizer prepared in Example 2 are both lower than that of the UF prepared in Comparative example 1, indicating that the introduction of YHA can reduce the crystallinity of UF, which is conducive to microbial degradation of the weathered coal-derived humic acid/urea-formaldehyde slow-release fertilizer and improves its release rate of nutrient.

Figure 5:
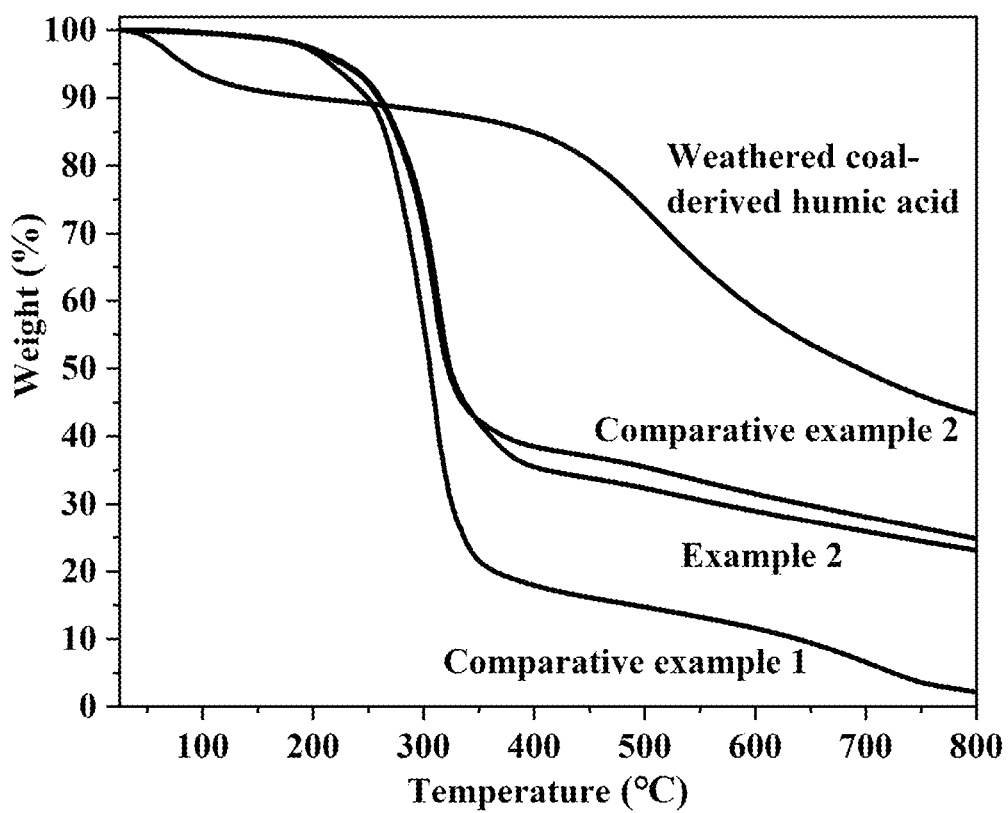
FIG. 5 shows thermogravimetric curves of the YHA/UF slow-release fertilizer prepared in Example 2 of the present disclosure, the UF slow-release fertilizer prepared in Comparative example 1, the mixture of YHA and UF prepared in Comparative example 2, and the YHA.

FIG. 5 shows thermogravimetric curves of the weathered coal-derived humic acid/urea-formaldehyde slow-release fertilizer prepared in Example 2, the urea-formaldehyde slow-release fertilizer (UF) prepared in Comparative example 1, the mixture of weathered coal-derived humic acid and urea-formaldehyde prepared in Comparative example 2, and the weathered coal-derived humic acid (YHA). In the FIG. 5, compared to the Comparative example 2, the slow-release fertilizer prepared in Example 2 has a reduced overall thermal stability and a higher heat-loss rate. Because the weathered coal-derived humic acid is reacted with the urea-formaldehyde in Example 2, and the weathered coal-derived humic acid molecules enter the main chains of the urea-formaldehyde molecules, destroying the regularity of the urea-formaldehyde molecule chains and reducing the crystallinity of the urea-formaldehyde, resulting in reducing the thermal stability of the material, which is conducive to improving the biodegradation rate of the modified UF, shortening the slow-release cycle, and solving the problem of excessively long slow-release cycle of UF, beneficial to plant growth and friendly to environmental protection, and can further expand the application range of UF.

Figure 6:
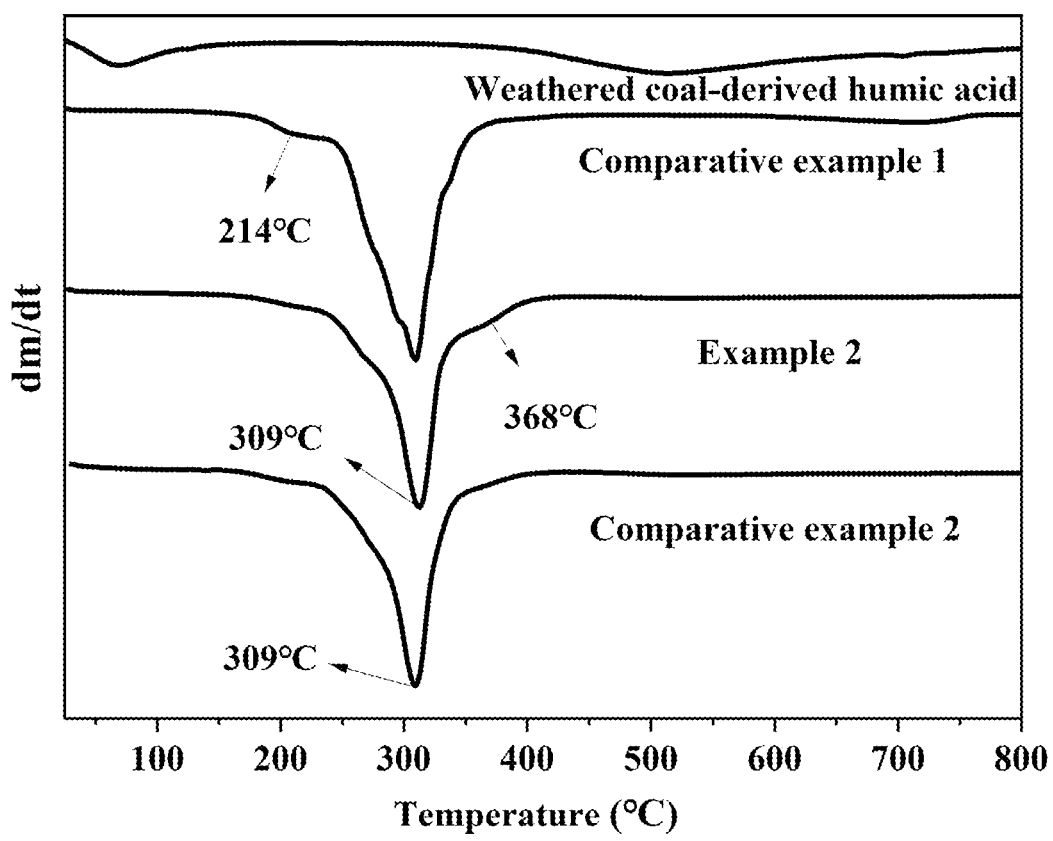
FIG. 6 shows differential curves of the thermogravimetric curves in FIG. 5.

FIG. 6 shows differential curves of thermogravimetric curves of the weathered coal-derived humic acid/urea-formaldehyde slow-release fertilizer prepared in Example 2, the urea-formaldehyde slow-release fertilizer (UF) prepared in Comparative example 1, the mixture of weathered coal-derived humic acid and urea-formaldehyde prepared in Comparative example 2, and the weathered coal-derived humic acid (YHA). The temperature range of 90-236° C. is the thermal decomposition peak of low-polymerization degree urea-formaldehyde, and the temperature range of 236-450° C. is the thermal decomposition peak of high-polymerization degree urea-formaldehyde. Referring to FIG. 6, it is not difficult to find that the thermal decomposition peak of the slow-release fertilizer prepared in Example 2 at 214° C. is significantly smaller than that of the urea-formaldehyde slow-release fertilizer prepared in Comparative example 1, indicating that there are fewer low-molecular-weight urea-formaldehyde polymers in the slow-release fertilizer prepared in Example 2. This is because the low-polymerization degree urea-formaldehyde undergoes a dehydration reaction with the weathered coal-derived humic acid, thereby reducing the content of soluble low-polymerization degree urea-formaldehyde. The decrease of the content of low-polymerization degree urea-formaldehyde will lead to a decrease of the initial nitrogen release rate of the weathered coal-derived humic acid/urea formaldehyde slow-release fertilizer, so as to solve a nutrient loss problem caused by the initial nitrogen release rate at an early stage of plant growth is much higher than the demand of plants.

Figure 7:
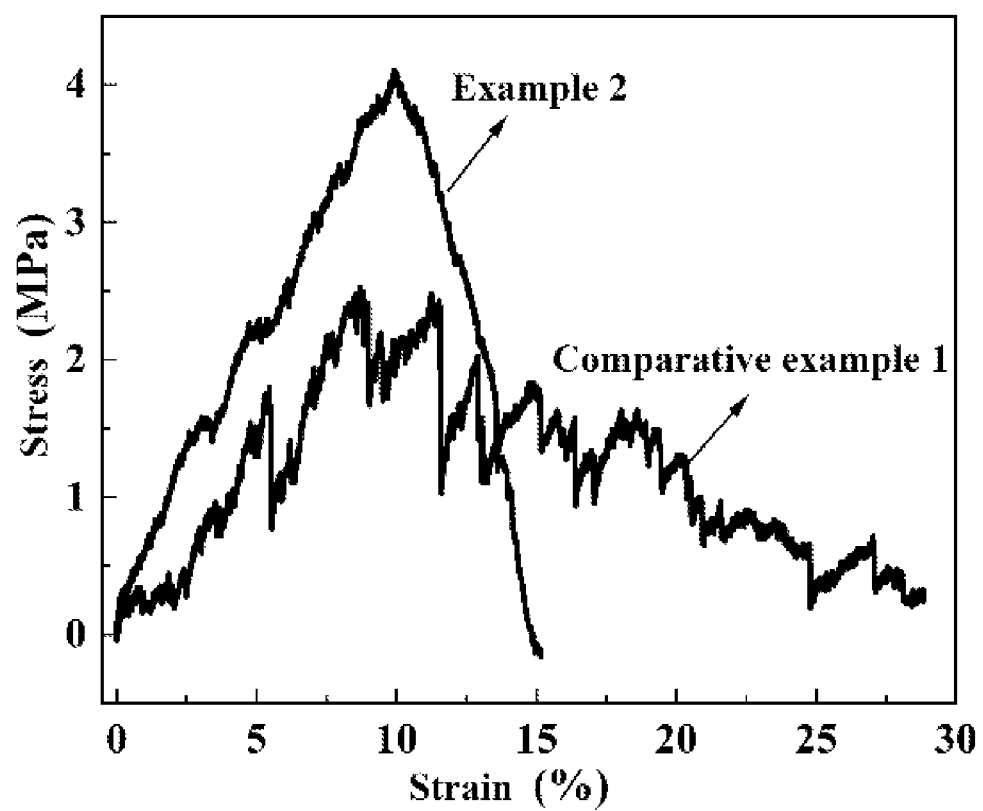
FIG. 7 shows compressive strength test curves of the YHA/UF slow-release fertilizer granules prepared in Example 2 of the present disclosure and the UF slow-release fertilizer granules prepared in Comparative example 1.

FIG. 7 shows compressive strength test curves of the weathered coal-derived humic acid/urea formaldehyde slow-release fertilizer granules prepared in Example 2 and the urea formaldehyde slow-release fertilizer granules prepared in Comparative example 1. The compressive strength of the slow-release fertilizer granules prepared in Example 2 is 4.14 MPa, which is much higher than the compressive strength of 2.48 MPa of the urea-formaldehyde slow-release fertilizer granules, indicating that the weathered coal-derived humic acid participated in the polycondensation of hydroxymethylurea during reactive extrusion process. The prepared fertilizer has high compressive strength due to the presence of benzene ring and other rigid groups in the weathered coal-derived humic acid molecules.

Figure 8:
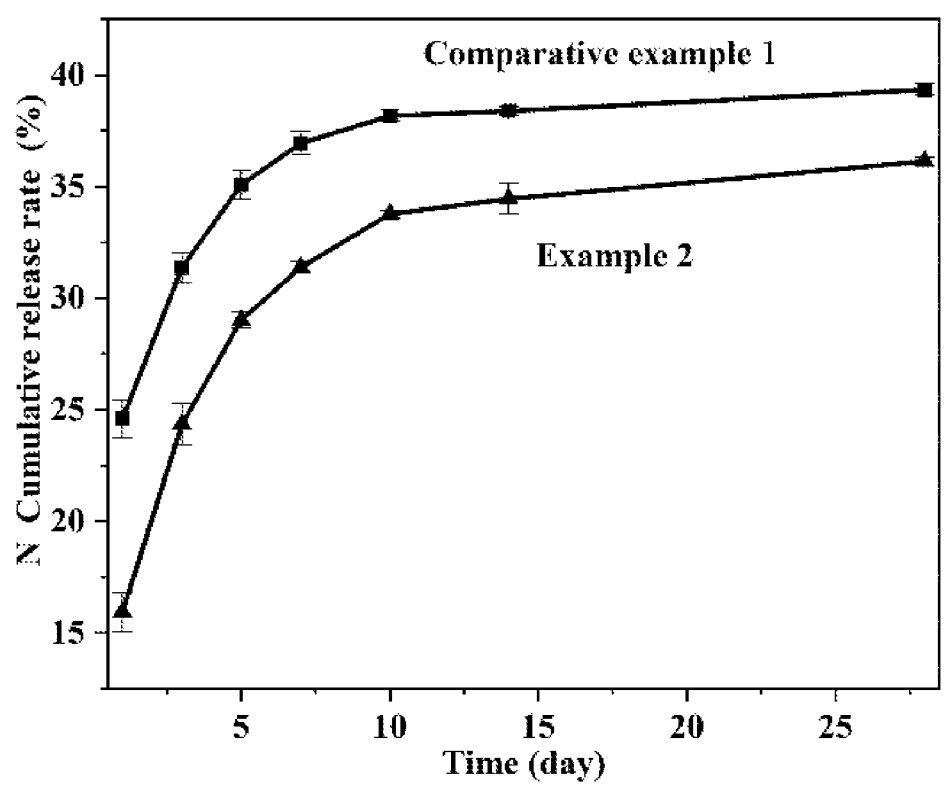
FIG. 8 shows nutrient release curves of the YHA/UF slow-release fertilizer granules prepared in Example 2 of the present disclosure and the UF slow-release fertilizer granules prepared in Comparative example 1 in still water.

FIG. 8 shows nutrient release curves in still water of the weathered coal-derived humic acid/urea formaldehyde slow-release fertilizer granules prepared in Example 2 and the urea formaldehyde slow-release fertilizer granules prepared in Comparative example 1. Referring to FIG. 8, the nitrogen release rate on day 1 of the slow-release fertilizer granules prepared in Example 2 is significantly lower than that of the urea-formaldehyde slow-release fertilizer granules prepared in Comparative example 1, indicating that the proportion of easily degraded low-polymerization degree urea-formaldehyde is decreased and the release rate of nitrogen nutrient at the early stage is decreased after modified by the weathered coal-derived humic acid. On days 14-42, the nitrogen release amount of the slow-release fertilizer granules of the Example 2 is 1.98 times that of the urea-formaldehyde slow-release fertilizer granules of the Comparative example 1, indicating that the nitrogen release rate at the middle and later stages of the weathered coal-derived humic acid/urea formaldehyde slow-release fertilizer granules is significantly higher than that of the urea formaldehyde slow-release fertilizer granules. It can be seen that after modified by the weathered coal-derived humic acid, the released rate of nitrogen nutrient at the early stage of the urea-formaldehyde fertilizer is decreased, and the released rate of nitrogen nutrient at the middle and late stages of the urea-formaldehyde fertilizer is improved, such a nutrient release law will improve the utilization efficiency of the fertilizer and is more suitable for demands of plant growth.

Figure 9:
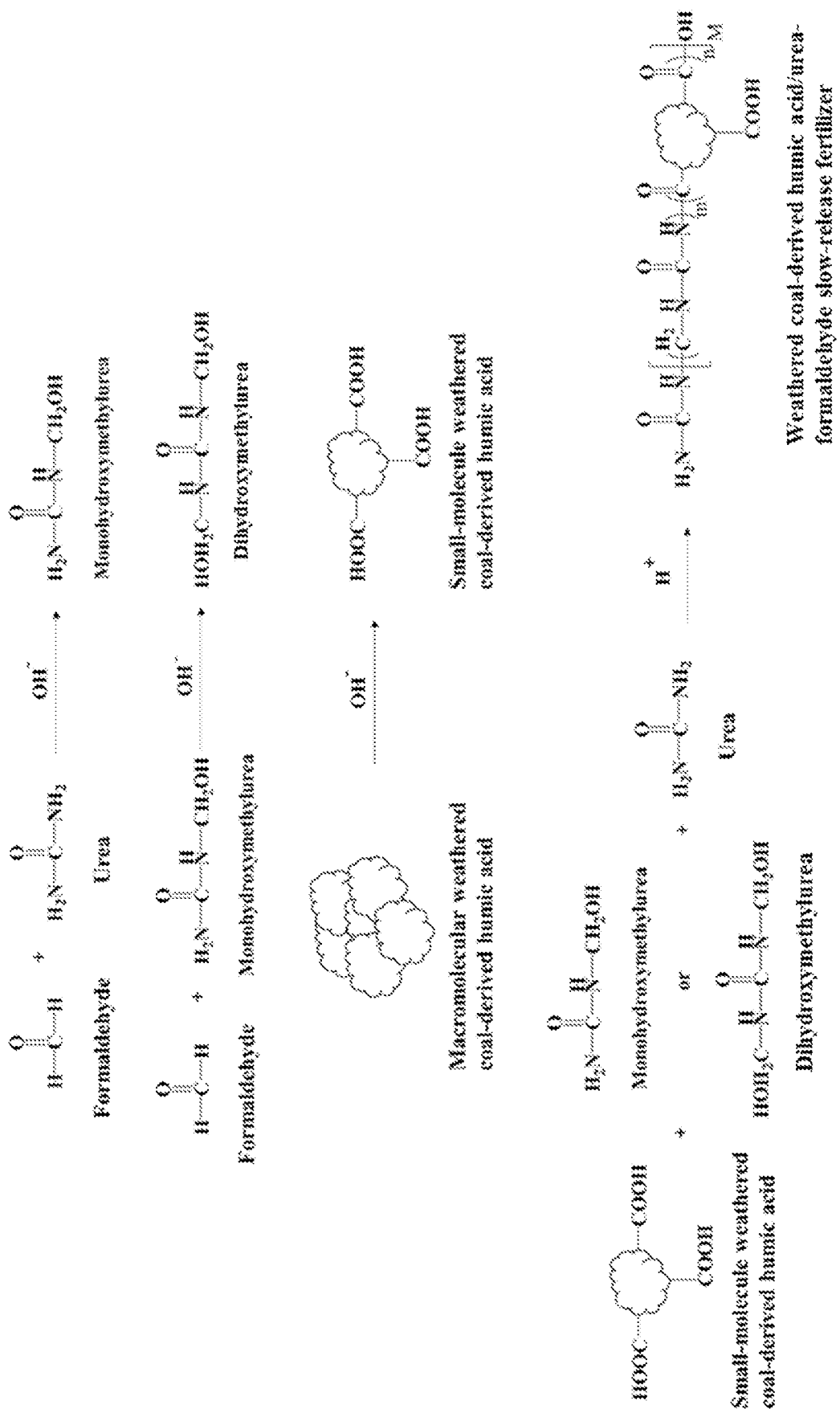
FIG. 9 schematically shows a reaction mechanism of the preparation of the YHA/UF slow-release fertilizer by reactive extrusion according to an embodiment of the present disclosure.

FIG. 9 shows the reaction mechanisms of the preparation of the weathered coal-derived humic acid/urea-formaldehyde slow-release fertilizer during extrusion process. In the figure, m=1-10, n=1-5, and M=1-100. First, in an alkaline environment, paraformaldehyde is depolymerized into formaldehyde small molecules and is reacted with urea in the system to form monohydroxymethylurea and dihydroxymethylurea. After that, with the help of the alkaline activator subsequently added to the reaction system to further create an alkaline environment, combined with a strong shearing action of the screws of the twin-screw reactive extruder, the macromolecular weathered coal-derived humic acid in the system is depolymerized into relatively small molecule weathered coal-derived humic acid and a large amount of active group (carboxyl group) is exposed. A part of the active —COOH functional group immediately reacts with the —NH$_2$ in the urea-formaldehyde molecule generated by in-situ polycondensation during the reactive extrusion process to produce weathered coal humic acid/urea-formaldehyde slow-release fertilizer. Therefore, the process can carry out simultaneously the depolymerization and activation reactions of the weathered coal-derived humic acid, the condensation reaction of the hydroxymethylurea to generate urea-formaldehyde, and the polycondensation reaction between the generated activated weathered coal-derived humic acid and the generated urea-formaldehyde in the twin-screw reactive extruder, so as to avoid a single activating process of the weathered coal-derived humic acid and a large amount of activation wastes generated by the process, thus saving manpower and material resources and avoiding environmental pollution. And a trinity reaction has advantages of low cost, green, efficiency, and stability.

Described above are only specific embodiments of this application to enable those skilled in the art to understand or implement the technical solutions of this application. Though the disclosure has been described in detail above with reference to embodiments, those of ordinary skill in the art can still make various modifications and equivalent replacements to some or all of technical features mentioned in the embodiments. It should be understood that those modifications and replacements made without departing from the spirit of this application shall fall within the scope of this application defined by the appended claims.

What is claimed is:

1. A method for preparing a weathered coal-derived humic acid/urea-formaldehyde slow-release fertilizer granule by reactive extrusion process with depolymerization-activation-polycondensation trinity, comprising:
    (1) adding urea, paraformaldehyde, and water to a reactor followed by adjustment to pH 8-12 and reaction at 30-80° C. for 1-3 h to obtain a hydroxymethylurea solution;
    wherein a mass ratio of urea to paraformaldehyde is 2-4:1, and the water is 10-50% of a total mass of urea and paraformaldehyde;
    (2) adding a weathered coal-derived humic acid and an alkaline activator to the hydroxymethylurea solution obtained in the step (1) followed by reaction at 30-80° C. for 5-30 min to obtain a reaction mixture;
    wherein the weathered coal-derived humic acid is 10-50% of the total mass of urea and paraformaldehyde; and the alkaline activator is 0-10% of a mass of the weathered coal-derived humic acid;
    (3) sealing a die orifice between a reaction unit and an extrusion unit of a reaction-extrusion integrated machine; and adjusting the reaction mixture obtained in the step (2) to pH 3-5 followed by feeding to a twin-screw reactive extruder of the reaction unit of the reaction-extrusion integrated machine;
    (4) starting screws of the twin-screw reactive extruder, and simultaneously starting a vacuumization-devolatilization device of the twin-screw reactive extruder to remove moisture from the reaction mixture, and reacting the reaction mixture at a temperature of 50-90° C. and a screw rotation speed of 50-150 rpm for 10-30 min; during this process, depolymerization and activation reactions of the weathered coal-derived humic acid, a condensation reaction of the hydroxymethylurea to generate urea-formaldehyde, and a polycondensation reaction between the generated activated weathered coal-derived humic acid and the generated urea-formaldehyde are carried out simultaneously;
    (5) opening the die orifice between the reaction unit and the extrusion unit, and starting a twin-screw extruder of the extrusion unit such that a reaction product obtained in the step (4) is delivered by the twin-screw reactive extruder of the reaction unit to the twin-screw extruder of the extrusion unit; and extruding the reaction product at an extrusion temperature of 50-90° C. and a screw rotation speed of 50-150 rpm through the twin-screw extruder to obtain a strip product; and
    (6) drying the strip product obtained in the step (5) at a preset temperature followed by granulation to obtain the weathered coal-derived humic acid/urea formaldehyde slow-release fertilizer in a cylindrical particle form, wherein weathered coal-derived humic acid molecules are inserted into a main chain of urea formaldehyde.

2. A fertilization method, comprising:
    (1) adding urea, paraformaldehyde, and water to a reactor followed by adjustment to pH 8-12 and reaction at 30-80° C. for 1-3 h to obtain a hydroxymethylurea solution;
    wherein a mass ratio of urea to paraformaldehyde is 2-4:1, and the water is 10-50% of a total mass of urea and paraformaldehyde;
    (2) adding a weathered coal-derived humic acid and an alkaline activator to the hydroxymethylurea solution obtained in the step (1) followed by reaction at 30-80° C. for 5-30 min to obtain a reaction mixture;
    wherein the weathered coal-derived humic acid is 10-50% of the total mass of urea and paraformaldehyde; and the alkaline activator is 0-10% of a mass of the weathered coal-derived humic acid;
    (3) sealing a die orifice between a reaction unit and an extrusion unit of a reaction-extrusion integrated machine; and adjusting the reaction mixture obtained in the step (2) to pH 3-5 followed by feeding to a twin-screw reactive extruder of the reaction unit of the reaction-extrusion integrated machine;
    (4) starting screws of the twin-screw reactive extruder, and simultaneously starting a vacuumization-devolatilization device of the twin-screw reactive extruder to remove moisture from the reaction mixture, and reacting the reaction mixture at a temperature of 50-90° C. and a screw rotation speed of 50-150 rpm for 10-30 min; during this process, depolymerization and activation reactions of the weathered coal-derived humic acid, a condensation reaction of the hydroxymethylurea to generate urea-formaldehyde, and a polycondensation reaction between the generated activated weathered coal-derived humic acid and the generated urea-formaldehyde are carried out simultaneously;
    (5) opening the die orifice between the reaction unit and the extrusion unit, and starting a twin-screw extruder of the extrusion unit such that a reaction product obtained in the step (4) is delivered by the twin-screw reactive extruder of the reaction unit to the twin-screw extruder of the extrusion unit; and extruding the reaction product at an extrusion temperature of 50-90° C. and a screw rotation speed of 50-150 rpm through the twin-screw extruder to obtain a strip product;
    (6) drying the strip product obtained in the step (5) at a preset temperature followed by granulation to obtain a weathered coal-derived humic acid/urea formaldehyde slow-release fertilizer granule in a cylindrical particle form, wherein weathered coal-derived humic acid molecules are inserted into a main chain of urea formaldehyde; and
    (7) applying, by a sowing-fertilization machine, the weathered coal-derived humic acid/urea formaldehyde slow-release fertilizer granule while performing sowing.

3. The fertilization method of claim 2, wherein an application amount of the weathered coal-derived humic acid/urea formaldehyde slow-release fertilizer granule is 8-15 kg of nitrogen per mu.

* * * * *